A. H. FOX.
RAILWAY VEHICLE MAGNET AND ROADWAY THEREFOR.
APPLICATION FILED MAR. 6, 1909.
1,088,814.
Patented Mar. 3, 1914.
5 SHEETS—SHEET 3.
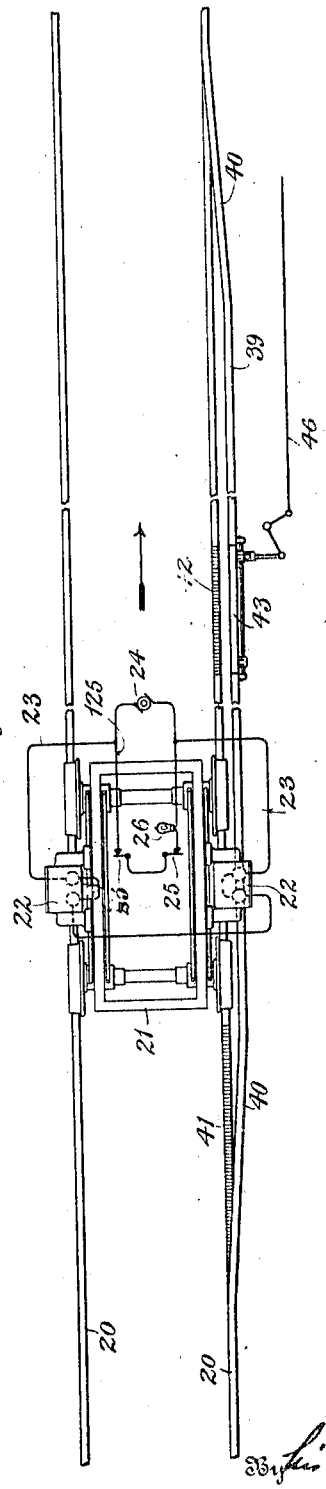
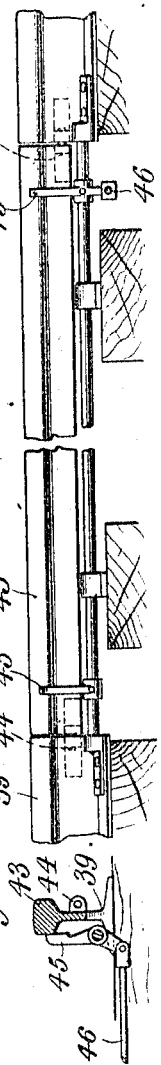

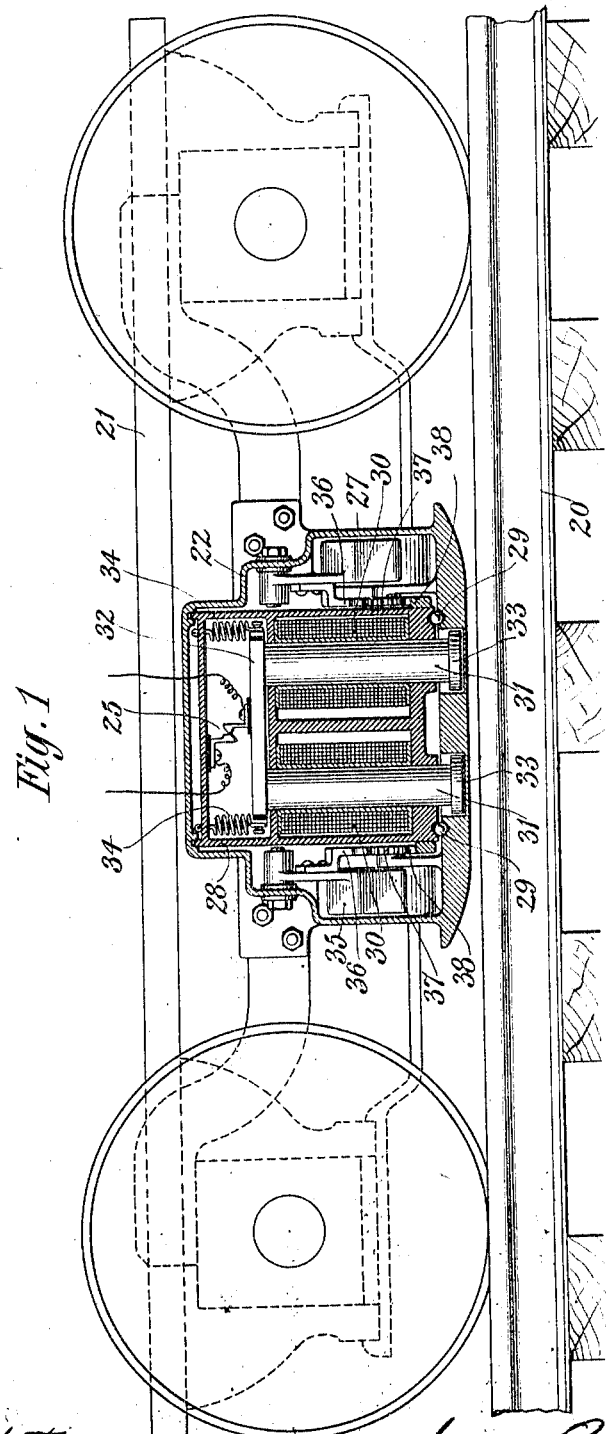

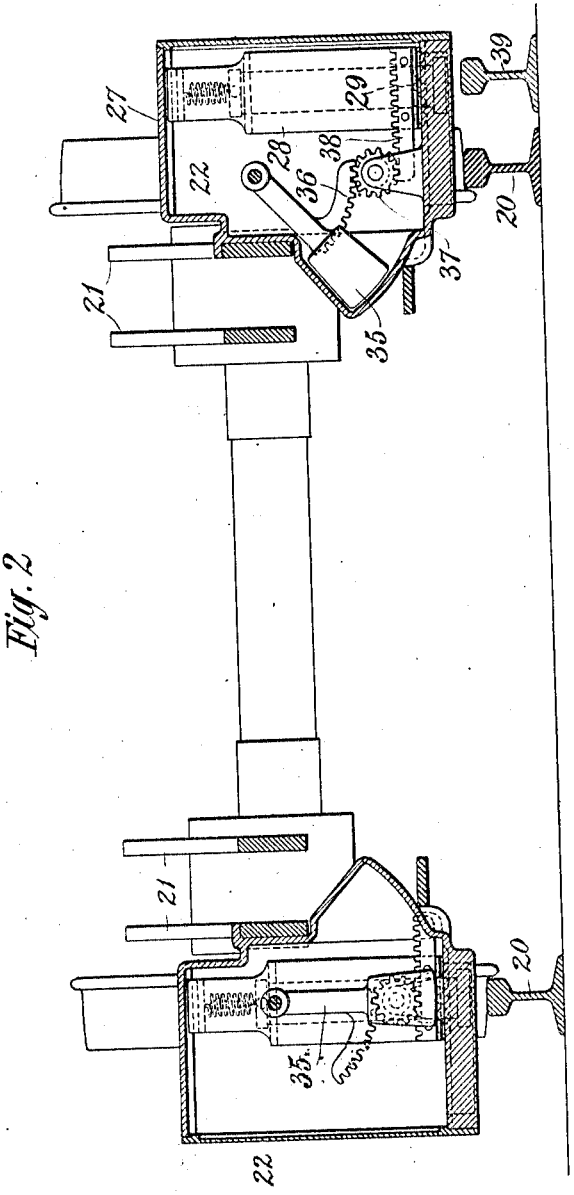

A. H. FOX.
RAILWAY VEHICLE MAGNET AND ROADWAY THEREFOR.
APPLICATION FILED MAR. 6, 1909.
1,088,814.
Patented Mar. 3, 1914.
5 SHEETS—SHEET 4.
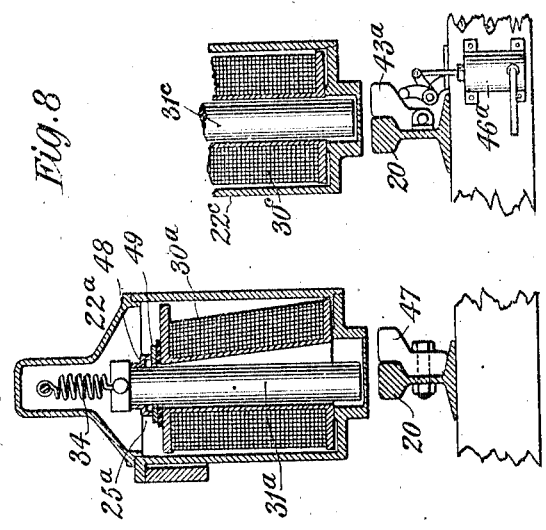
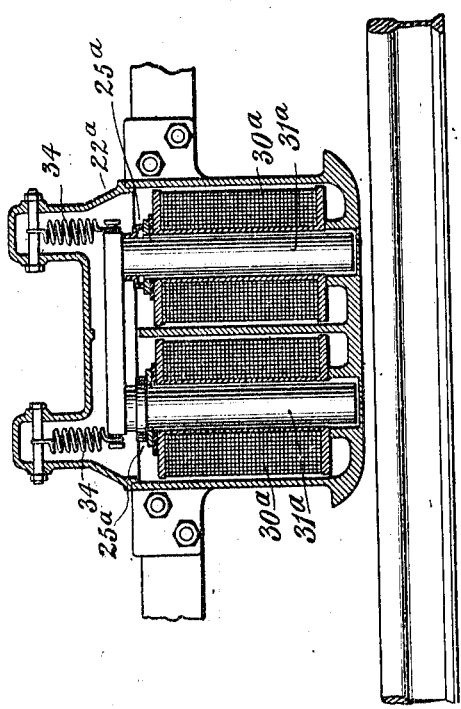
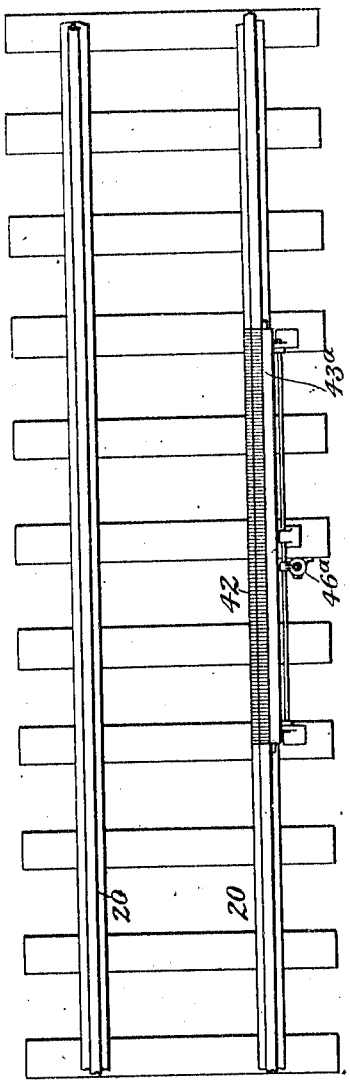

A. H. FOX.
RAILWAY VEHICLE MAGNET AND ROADWAY THEREFOR.
APPLICATION FILED MAR. 6, 1909.
1,088,814.
Patented Mar. 3, 1914.
5 SHEETS—SHEET 5.
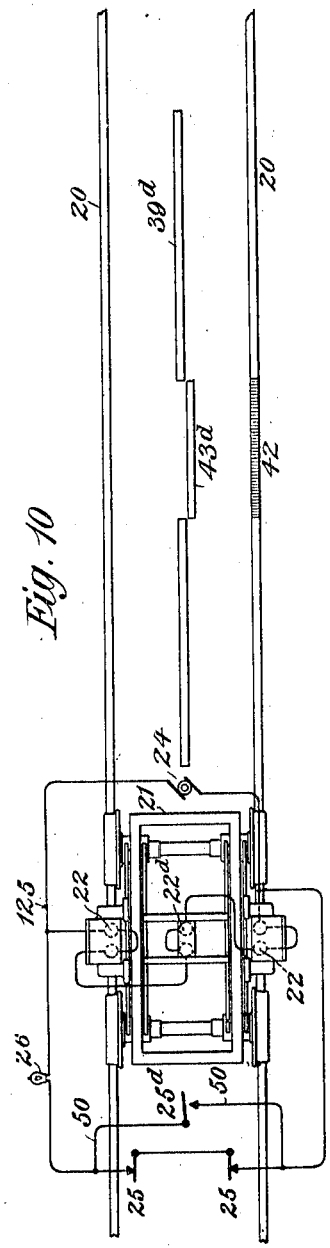
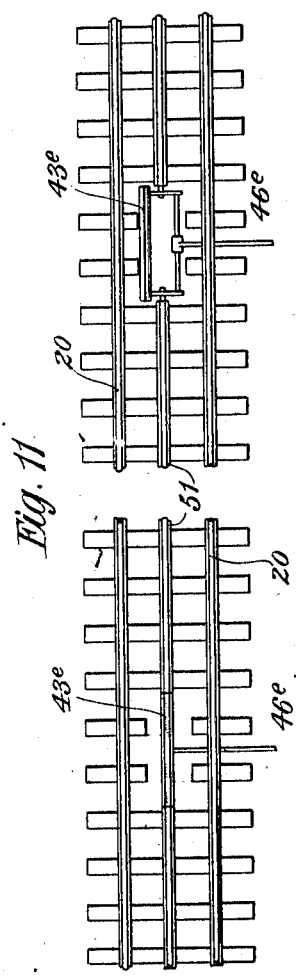
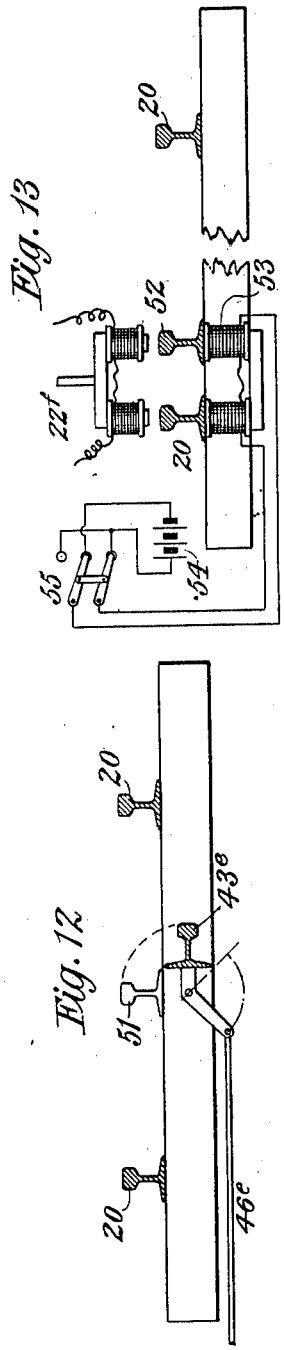

UNITED STATES PATENT OFFICE.

AUSTEN H. FOX, OF NEW YORK, N. Y.

RAILWAY-VEHICLE MAGNET AND ROADWAY THEREFOR.

1,088,814.   Specification of Letters Patent.   Patented Mar. 3, 1914.

Continuation of application Serial No. 423,139, filed March 25, 1908. This application filed March 6, 1909. Serial No. 481,780.

*To all whom it may concern:*

Be it known that I, AUSTEN H. Fox, a citizen of the United States, residing at New York, in the county of New York and State of New York, have invented certain new and useful Improvements in Railway-Vehicle Magnets and Roadways Therefor, of which the following is a specification.

This invention relates to the class of railway controlling or signaling devices including a magnet on the car or train, coöperating with the running rail or other armature substantially co-extensive with the roadway, said rail having magnetic interruptions or other means of magnetically differentiating it at control points so as to give an indication on the car or train when the latter passes a control point unless said magnetic interruption or differentiation is bridged, effaced, or counteracted.

My invention involves the use of a self-restoring magnet or detector, that is, one adapted to automatically resume its condition of influence by, or attracted position with respect to the armature rail after the magnetic gap or differentiation has been passed, or after it has been bridged, effaced or counteracted, whereby I avoid the complication, added cost and other defects of prior systems requiring a separate magnet under control of the engineer for the restoration of the detector magnet.

Further objects of my invention are: first to provide improved means for counteracting the effect on the car magnet or detector mechanism of gaps in the roadway armature; secondly to control the indication or other function performed on the movable unit variably or at will by certain prearranged conditions in the roadway; thirdly to utilize the running rail itself together with certain novel appurtenances as a means for such variable control; fourthly to add to the functions of the magnetic detector devices and to concentrate a plurality of these functions in a single instrument; and fifthly to simplify and otherwise improve the construction and operation of that instrument in the particulars more fully set forth in the following description.

This application is a continuation of my application Serial No. 423,139, filed March 25, 1908.

Of the accompanying drawings, Figure 1 represents a longitudinal elevation and section of a railway and car-truck embodying my improvements. Fig. 2 represents a transverse section. Fig. 3 represents a plan view. Fig. 4 represents a side elevation showing a movable section in the directing rail at a control point. Fig. 5 represents a transverse section of the movable rail member. Fig. 6 represents a longitudinal section showing a modified detector. Fig. 7 represents a transverse section thereof. Fig. 8 represents a transverse view of another modification including a movable controlling section upon the running rail. Fig. 9 represents a plan view of the roadway construction adapted for these modified detectors. Fig. 10 represents a plan view showing a modification consisting in the use of an armature rail with a movable magnetic section opposite a non-magnetic running-rail section, and a second detector magnet controlling the circuit of the main magnet and adapted to shunt the effect of the release of the main magnet when it is not desired to give an indication. Fig. 11 represents a plan view of an arrangement including the use of a continuous armature rail which is not one of the running rails. Fig. 12 represents a cross-section of this arrangement. Fig. 13 represents a transverse section showing means for differentiating sections of the roadway armature by magnetic repulsion.

The principle of operation of my system when used as a whole is that of establishing communication between the movable unit and the roadway by the attraction, exerted continuously between control points on the roadway, between an armature on the roadway and a magnet on the unit. The interruption or magnetic differentiation of the armature releases or weakens a magnetic attraction in such manner as to give the desired indication or performance on the unit, and thus if there is any failure or derangement the failure is on the side of safety, and shown in the giving of the indication. If the armature consists of one of the running rails, the magnetic interruption (when prearranged) must not be a physical interruption and hence I prefer to employ a magnetically-interrupting section composed of some such material as manganese steel. In order to inhibit or be in a position to inhibit or counteract the giving of the indication when the car or cars carrying the detector devices comes over one of these non-magnetic rail sections I prefer to place alongside of or parallel with the running-rail section, a by-passing or counteracting rail which is, or may be, wholly or partly adjustable so that it or its movable section may be moved within or without the influence of the car-magnet or of one of a plurality of coöperating magnets. When the movable magnetic rail section is within the influence of the car magnet it maintains the roadway armature devices as a whole magnetically intact when the magnet passes over the non-magnetic section, and prevents the giving of the indication, but if the movable rail section is drawn away to leave a magnetic gap the magnet will cause the desired indication to be given on the movable unit. The roadway armature may however be differentiated at control points otherwise than by magnetic interruption, as for example by magnetic repulsion.

Although the detectors here shown are electro-magnets, the invention is not wholly confined to that type.

In speaking of the "car" or "vehicle" it will be understood that I also include an articulated unit or train.

Referring at first to Figs. 1–5 inclusive, 20, 20 indicate the running rails, 21 the truck of a car or engine thereon, and 22 an electro-magnetic detector mounted on the truck over one of the running rails. In Fig. 3 I have shown two of these detectors on opposite sides of the truck, one over each running-rail so that when the vehicle is turned around end-for-end there will still be a detector operating over that rail which is associated with the controlling devices. In these illustrations it is assumed that the right-hand running-rail is so equipped and normal traffic is in the direction of the arrow in Fig. 3. On a single-track road both rails will preferably be provided with controlling devices of the character hereinafter mentioned, one rail for each direction of the traffic, and suitable eliminating devices provided for cutting out the inactive side of the car when there are detectors on both sides. These devices do not form a part of the present invention and hence are not illustrated.

The coils of the detector magnets are here shown as included in series in a closed circuit 23 with a dynamo 24 or other source of current, and each magnet controls a switch 25 in series in a circuit 125 with the source of current and with a suitable device for giving the indication, which device I have represented as a lamp 26. Any suitable or well-known devices for shutting off the power, applying air-brakes, etc., may be employed in place of or in conjunction with the lamp, and these various functions are for present purposes comprehended under the expression, "giving an indication". The attraction of the detector magnet for the roadway armature keeps the switch 25 closed and the lamp 26 illuminated, and the release of the magnet by the interruption of the armature opens the switch and gives the signal or indication by extinguishing the lamp; but the invention is not limited to opening a normally-closed circuit by the release of the magnet, nor indeed to the actuation of any electrical device, since the operation on the car may be wholly mechanical.

In the construction now being described the function of a car magnet in opening and closing an electric switch, and the further function of being responsive to control in places where the running rail is magnetically interrupted or differentiated, are combined in one instrument. These functions might be performed by separate magnets as I shall hereinafter point out in connection with Fig. 10, but to perform them with a single magnet leads to a simpler, lighter and less expensive construction of the detector and also to certain advantages in constructing the roadway.

Returning to the description of Figs. 1–5, 27 indicates the outer casing of the detector bolted to the truck frame, and 28 indicates a magnet carrier, movable horizontally in a transverse direction in suitable guides within said outer casing, the lower set of guides consisting as here shown of ball bearings 29. 30 are the spools or windings of a double solenoid magnet, attached to the carrier 28 and constantly energized as previously described, and 31 are vertically-movable magnet cores connected at their upper end by a magnetic yoke 32 but having their lower ends separated longitudinally and running close enough to the magnetic running-rail 20 to be within the influence of the latter and normally attracted downwardly thereby. The rail thus tends to complete the magnetic gap between the magnet poles and to keep the switch 25 closed. This attraction will be effective whenever there is an armature under or adjacent to the magnet and capable of attracting said magnet, and hence the latter is "self-restoring", that is drawn by its own magnetism toward the armature rail after a magnetic interruption in the latter has been passed or filled or counteracted. The frame 27 or at least its lower wall in the vicinity of the core ends, is preferably of non-magnetic material, and it may as shown cover over the pole-pieces so that no moving parts are exposed.

Opposed to the downward attraction of the magnetic rail 20, but of less effect than the latter, is an influence tending to move the cores 31 upwardly when there is no armature present or when a magnetic gap has been encountered, and this influence may be magnetic or mechanical or both. By providing enlarged iron masses 33 at the lower ends of the cores I am able to create an upward magnetic force of the desired intensity but have also shown upwardly-acting springs 34 suspending the core structure from the carrier 28.

To establish a yielding force normally holding the magnet carrier 28 over the running rail 20 but permitting it to move outwardly therefrom on occasion, I provide a weighted lever 35 connected with the carrier 28 by a gear segment 36 on the lever, a pinion 37 on the detector casing, and a rack 38 on the carrier. This mechanism is provided in duplicate for the two ends of the detector. Normally the weighted lever tends to hang vertically, as shown at the left in Fig. 2, keeping the carrier 28 over the running rail, but an outwardly-acting magnetic force of sufficient magnitude would cause the carrier to depart laterally from its normal position and bring the weighted lever into an angular position, as shown at the right in Fig. 2. When the outward force ceases to act, the parts automatically resume their normal positions with the magnet directly over the running rail. One of the advantages of this mechanism is that it is balanced against transversely operating inertia forces. It is possible to make various modifications of the illustrated structure giving the combined vertical and lateral movement to the detector magnet, and it is also within the scope of my invention to utilize either or both of these movements for the performance of functions other than or additional to those herein described. It is further within the scope of the invention to employ an electromagnet with the core rigidly attached to and movable with the winding.

The transverse movement of the detector magnet is here utilized to bring it, at certain control or other points along the roadway, over a magnetic rail placed alongside of or parallel to the running rail. For example this may be done when it is desired to permanently avoid the effect of non-magnetic sections in the running rail. Manganese steel sections are commonly placed in the running rails of railways on curves, switch points, frogs, etc., to reduce wear, and when these do not coincide with control points I may by-pass them by a magnetic rail laid alongside of the running rail and producing the described lateral movement of the detector magnet which keeps it over a magnetic rail and maintains the detector switch closed. A short magnetic interruption does not require any by-passing rail because the detector magnet itself is able to bridge such an interruption without losing its "hold" or effective pull, and therefore a magnetically continuous armature rail is to be understood as one which is continuous with relation to the magnet structure on the movable unit.

My invention includes the use of any suitable means for maintaining magnetic continuity in spite of the presence of the non-magnetic sections, and it includes as well the means hereinafter described, or substantial equivalents, for magnetically differentiating sections of the roadway armature structure at will.

When manganese steel sections are placed in the running rail at control points for the purpose of giving an indication, I may utilize the described expedient of a by-passing or counteracting rail but constitute it as, or provide it with, a movable member coincident with the non-magnetic running-rail section, the absence of which member from the magnetic field will cause the indication to be given. One form of this counteracting rail with a movable filler is shown in Figs. 2, 3, 4, and 5. 39 is the by-passing rail preferably having end portions 40 which depart from and approach the running rail at an easy angle so that the magnet may be carried outward over and returned from the by-pass at high train speeds without breaking the control. The main rail opposite the entrance to the by-passing rail should be non-magnetic as indicated at 41, and for its whole extent opposite the rail 39 it could be non-magnetic. 42 indicates a non-magnetic (manganese steel) section in the running rail at the control point, and opposite this is a hinged filler or magnetic rail section 43 in the by-passing rail 39 under control by any suitable influence such as a semaphore, switch lever, or other controller (not shown). This filler is unstably mounted so that it tends to fall outwardly and create a magnetic gap, and if the connections fail this will tend to be the result, giving a safety indication or performance on the vehicle. The hinge 44 is placed out of line with the center of gravity, and rock-arms 45 are provided under control of the external operating connections 46 for either holding the filler 43 in line with the rest of the by-passing rail or permitting it at will to fall outwardly and create the magnetic gap. This filler might be non-magnetically incased to protect it, as will be understood without illustration. In the operation of this form of the invention the cores 31 of the detector magnet 22 are normally attracted downwardly by the magnetic running rail 20 because they have a better magnetic circuit with the presence of said rail than without it. This keeps the switch 25 closed and the lamp 26 glowing. The magnet carrier 28 then occupies its inward position over the running rail and the weighted lever 35 is vertical. Transverse jars do not tend to disturb this position because the forces of inertia acting on the magnet carrier and weighted lever are brought into opposition. Assuming the vehicle carrying the detector magnet to reach a by-passing rail 39, the attraction of the magnet for said rail will draw the carrier 28 outwardly against the force of gravity acting on the weighted lever, the magnet cores 31 still remaining down and the switch 25 closed. If the movable filler 43 is raised into line with the rest of the by-passing rail the detector magnet will pass over it without releasing the switch 25 and will return over the running rail at the end of the by-passing rail, but if the filler is depressed, leaving a magnetic gap, the cores 31 will be released or drawn upwardly and cause the switch 25 to open and the lamp 26 to be extinguished. The magnet is then immediately returned inwardly by the weighted lever 35 to its normal position over the running rail and as soon as it reaches a magnetic portion of said rail the cores will again be attracted downwardly and the switch closed. The indication or other performance established by the opening of the switch may however be perpetuated by suitable means which it is not necessary to illustrate in the present application. Should the vehicle stop with its detector over a non-magnetic section, the restoration of the magnetic filler will automatically restore the detector to its attracted condition without any act on the part of the engineer.

In the modification shown in Figs. 6, 7 and 9 the detector $22^a$ is made without any laterally-movable magnet carrier but instead, the magnet cores $31^a$ are adapted to swing transversely in flaring cavities in the coils $30^a$ to keep said cores in line with a by-passing rail, and the latter may consist merely of a movable magnetic rail section $43^a$ mounted close alongside of the non-magnetic section 42 of the running rail as shown in Fig. 9, or it may consist of a fixed magnetic rail section 47 as shown in Fig. 7 located permanently alongside of any non-magnetic section of the running rail at points where it is not desired to give an indication on the car. In this form of the detector the members 48, 49 of the switch $25^a$ may have a special construction adapted for the tilting movement, the upper member 48 being shown as a cup whose edge maintains contact with the annular lower member 49 during the angular movement of the cores, but will separate from the lower member when the cores are released. Any other suitable form of switch may be used in this or the other embodiments of my invention, and it is observable that by making the coil stationary and the core movable I reduce the effect of road shocks tending to give false indications. Various embodiments of this idea are possible.

Fig. 8 represents a modified detector adapted for the roadway construction represented in Fig. 9 and here is shown the movable by-passing rail $43^a$ operated by a fluid cylinder $46^a$ under external control. It will be noted that the rail or rail-section $43^a$ is unstably pivoted on or adjacent to the vertical web of the running rail 20 so as to be partly protected thereby, and when released by the external connections is adapted to swing downwardly away from said rail. The core $31^c$ of the detector $22^c$ has only a vertical movement, and the magnet coil $30^c$ is or may be mounted in a fixed position on the truck with the polar axis substantially in line with the outer edge of the running rail, so that when a by-passing rail is reached the magnet core overlaps the position of said by-passing rail and is within the influence of either said rail or the magnetic part of the running rail. The lines of force from the magnet through the rail are then somewhat warped but still effective. It would obviously be possible to mount a magnet thus positioned, or the core of such a magnet, so as to be capable of a slight "seeking" movement in a lateral direction in accordance with the principles already described in connection with Figs. 2 and 7, to allow for endwise movement of the truck on the axle journals.

In Fig. 10 I have indicated a by-passing rail $39^d$ placed between the running rails outside of the influence of the main detector magnet 22 which in this case would preferably have the construction represented in Fig. 8 with only the vertical movement, or something equivalent. This magnet controls the switch 25 as before and the car-magnet apparatus or structure further includes a second detector magnet $22^d$ permissibly of the same construction which controls a second switch $25^d$ in a shunt circuit 50 around the switch 25. Whenever a by-passing rail $39^d$ is reached, the shunting detector $22^d$ will close its switch $25^d$ and if the by-passing rail be continuous past the manganese steel section 42 in the running rail the circuit of the lamp 26 will be kept closed although the switch 25 opens. If the by-passing rail have a movable section $43^d$ which is drawn aside to create a magnetic gap coincident with the non-magnetic section 42, the indication will be given by the extinguishment of the lamp when the detectors come over the two magnetic gaps, since both switches 25 and $25^d$ will then be opened.

Figs. 11 and 12 show a magnetic rail 51 other than one of the running rails, longitudinally coextensive with the roadway, and provided with movable magnetic sections or fillers $43^e$ controlled by outside connections $46^e$, said rail being adapted for use with any suitable form of magnetic detector, such as that of Fig. 8. With a single middle rail of this character, the track is adapted for traffic in either direction, although in thus using it for purposes of train control, certain problems would be involved with which the present application does not deal, and which are not involved, or not involved to the same extent in using the running rail or other side rail.

Fig. 13 shows a means for differentiating the armature rail by magnetic repulsion. Sections of a third rail 52 are laid alongside of one of the main rails at the signaling or controlling points and these two neighboring rails form the pole pieces of a track magnet 53 included in circuit with a battery 54 and a pole changer 55. The detector electromagnet 22$^f$ is also represented in U form with two spools. When the opposed pole pieces of the respective magnets 22$^f$ and 53 are of opposite polarity the magnet 22$^f$ is attracted downward, but when the polarity of the track magnet 53 is reversed by means of the pole changer 55 the detector magnet is repelled upward.

Various other modifications and adaptations may be made without departing from the invention, and its principles apply to so-called mono-rail roads. The forms of detectors and the forms of roadway armature devices herein described are especially adapted for conjoint use, but, as already instanced, the invention is not to be understood as being wholly confined to such conjoint use.

I claim:—

1. The combination of a railway having an armature substantially coextensive therewith, a vehicle on said railway carrying a magnetic detector which coöperates with said armature, said detector responding to magnetic gaps or differentiations in the armature and adapted to restore itself to normal condition by its attraction for the latter when said gap or differentiation is passed, effaced or counteracted, and indicating means on the vehicle controlled by said detector and adapted to respond to the latter's condition of attraction or release.

2. The combination of a railway having a magnetic running rail, non-magnetic sections interposed in said rail at intervals, and a vehicle carrying a self-restoring magnet which coöperates with said rail and is adapted to respond to the magnetic interruptions caused by said non-magnetic sections.

3. The combination of a railway having a magnetic running rail in which are interposed non-magnetic sections, a vehicle, a magnetic detector mounted on said vehicle and movable from a retracted position by its own attraction toward the magnetic part of said running rail, and means on the vehicle for indicating the response of said detector to the magnetic and non-magnetic sections of said rail.

4. In a railway control system, the combination of a railway vehicle unit having a magnet device adapted to be drawn from a retracted position by its own attraction toward a roadway armature, a roadway armature structure magnetically continuous between control points, and means for magnetically differentiating sections of said armature structure at will at said points.

5. In a railway control system, the combination of a roadway having an armature rail longitudinally coextensive with said roadway and magnetically interrupted at a control point, a movable magnetic section adapted to magnetically bridge or by-pass the interruption, a vehicle unit having a self-restoring magnet which coöperates with said rail, and means on the unit controlled by said magnet and adapted to respond to the latter's condition of attraction or release.

6. A railway having a magnetic running rail interrupted by a non-magnetic section, and a magnetic by-passing rail adjacent to said non-magnetic section and having an adjustable magnetic filler.

7. A railway having a magnetic running rail interrupted by a non-magnetic section, and a magnetic by-passing rail laid alongside of said non-magnetic section and having end portions departing from and approaching the running rail at easy angles.

8. A railway having a magnetic running rail interrupted by a non-magnetic section, a magnetic by-passing rail laid alongside of said non-magnetic section and having end portions departing from and approaching the running rail at easy angles, and an intermediate magnetic portion movable into and out of the line of said by-passing rail.

9. A railway having a longitudinal armature rail provided with a filler pivoted to move transversely of the line of the rail into a raised position of alinement with the body of the rail or into a depressed position of disalinement.

10. A railway having a magnetic running rail interrupted by a non-magnetic section, an armature member unstably pivoted close to the vertical web of said non-magnetic section and adapted to swing from its operative position downwardly away from said section, and external operating connections for supporting said member in its raised operative position.

11. The combination of a railway having a magnetically-interrupted running rail, a magnetic rail for by-passing the interruption in said running-rail, and a vehicle carrying a detector-magnet member which is movable transversely of the vehicle to coöperate with either of said rails and adapted by its release to give an indication on the vehicle.

12. The combination of a railway having a magnetically-interrupted running rail, a magnetic rail for by-passing the interruption in said running rail, a vehicle, and a detector-magnet member on said vehicle having a lateral movement to associate it by magnetic attraction with either of said rails, and an up-and-down movement to control an indication on the vehicle.

13. The combination of a railway vehicle, a detector-magnet member thereon having a combined lateral and up-and-down movement, and a roadway having an armature coöperating with said member.

14. The combination of a railway having an armature, a vehicle, and an electromagnetic detector on said vehicle having a coil and a core movable in said coil and adapted to be influenced by the armature.

15. The combination of a railway having a longitudinal armature-rail, a railway-vehicle, and an electromagnetic detector on said vehicle having a pair of coils whose axial plane is parallel to the rail, and a pair of cores movable longitudinally in said coils and adapted to have their magnetic circuit affected by the rail.

16. The combination of a railway vehicle, and an electromagnetic detector mounted on the lower part of said vehicle in position to coöperate with a roadway armature, said detector having a vertical coil, a core movable vertically in said coil in response to the presence or absence of the armature, and means to give an indication on the vehicle by the upward movement of the core.

17. The combination of a railway having an armature, a railway-vehicle, and an electromagnetic detector mounted on the lower part of said vehicle in position to coöperate with said armature, said detector having a coil, and a core mounted to move longitudinally and to swing in said coil in response to the presence or absence of the armature.

18. The combination of a railway having an armature, a railway-vehicle, and an electromagnetic detector thereon having a pair of coils, a pair of cores movable both longitudinally and laterally in said coils, their pole-pieces subject to said armature, and an electric switch held closed during the lateral movement but opened by longitudinal retraction of the cores.

19. The combination of a railway-vehicle, and an electromagnetic detector thereon having a pair of normally-energized coils, and a pair of yoked cores adapted to be projected longitudinally in said coils by the attraction of an external armature and provided with enlarged pole-pieces for yieldingly retracting the cores by magnetic force.

In testimony whereof I have hereunto set my hand in the presence of two subscribing witnesses, this fourth day of March 1909.

AUSTEN H. FOX.

Witnesses:
 EDWARD E. BLACK,
 R. M. PIERSON.